Figure 1:
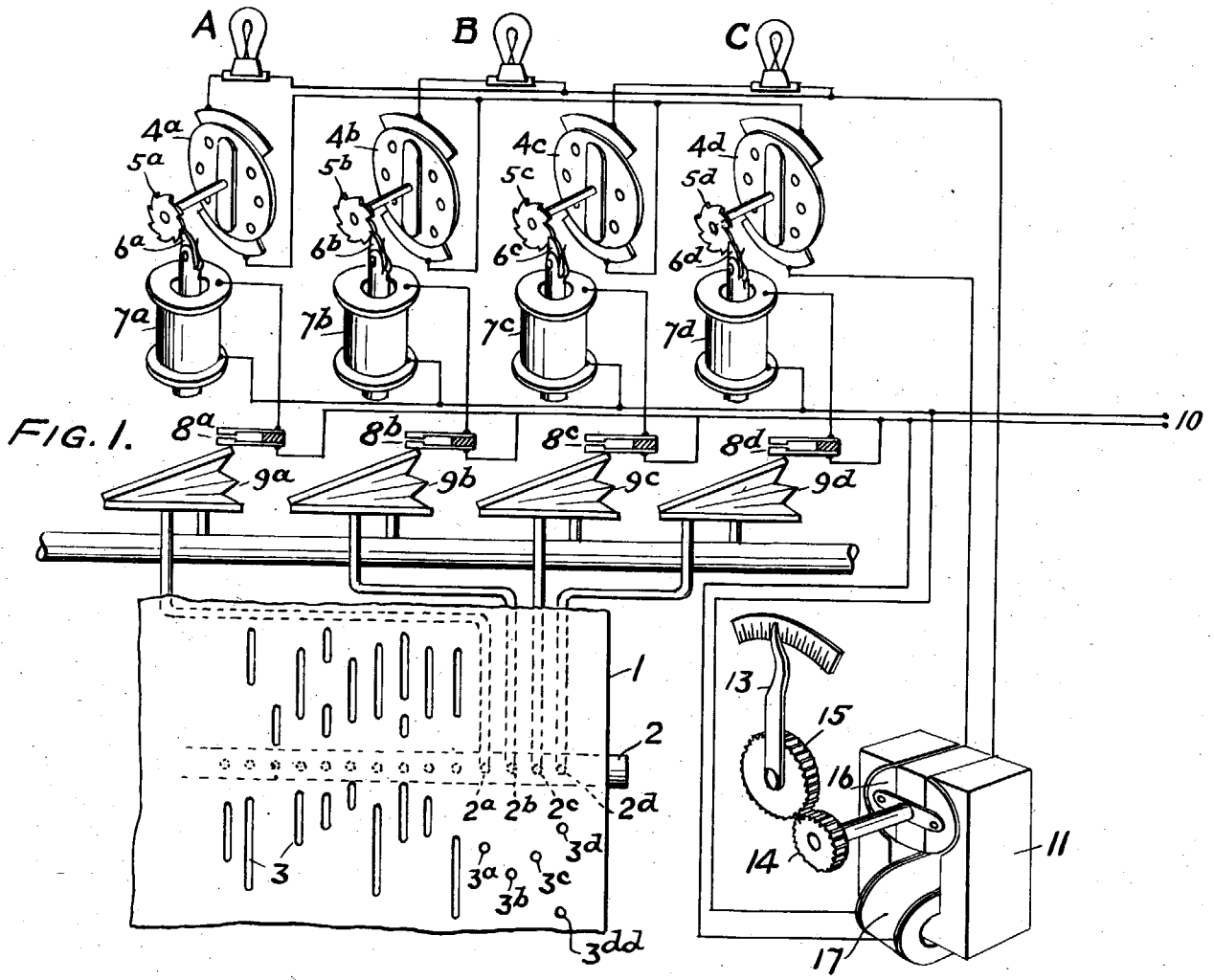

Dec. 20, 1927.

M. H. GREENEWALT

Re. 16,825

METHOD OF AND MEANS FOR ASSOCIATING LIGHT AND MUSIC

Original Filed Aug. 30, 1918 3 Sheets-Sheet 1

WITNESS:

Robt. R. Ketchel.

INVENTOR

Mary Hallock Greenewalt

BY

Busser & Harding

ATTORNEYS.

Dec. 20, 1927.

Re. 16,825

M. H. GREENEWALT

METHOD OF AND MEANS FOR ASSOCIATING LIGHT AND MUSIC

Original Filed Aug. 30, 1918 3 Sheets-Sheet 2

WITNESS:
Robt. R. Ketchel.

INVENTOR
Mary Hallock Greenewalt
BY
Busser + Harding
ATTORNEYS.

Dec. 20, 1927.

M. H. GREENEWALT

Re. 16,825

METHOD OF AND MEANS FOR ASSOCIATING LIGHT AND MUSIC

Original Filed Aug. 30, 1918 3 Sheets-Sheet 3

WITNESS:

Robt. R. Kitchel.

INVENTOR

Mary Hallock Greenewalt

BY

Busser & Harding

ATTORNEYS.

Reissued Dec. 20, 1927.

Re. 16,825

UNITED STATES PATENT OFFICE.

MARY HALLOCK GREENEWALT, OF PHILADELPHIA, PENNSYLVANIA.

METHOD OF AND MEANS FOR ASSOCIATING LIGHT AND MUSIC.

Original No. 1,481,132, dated January 15, 1924, Serial No. 252,133, filed August 30, 1918. Application for reissue filed October 15, 1924. Serial No. 743,839.

My invention relates broadly to the associating of light in various shades or intensities, which may be accompanied by color indication or sensation, with musical notes or tones in various shadings. My invention includes means for producing what in some instances would be flood lighting, and in other instances spots or zones of light, with or without color accompaniment in each instance, and in all instances the means employed shall be capable of effecting desired gradations in the lighting effects produced, from those of the greatest light intensity to the various degrees of what may be termined shade or darkness.

The object of my invention is to associate with musical or articulate sounds in various tones or shades a certain arbitrary system of brightening or darkening effects, with or without color accompaniment, peculiarly adapted to express or to complement the emotions produced by musical notes and tones in order that the pleasure derived by the individual through the sense of hearing may be enhanced through the sense of sight.

It is obvious that the field in which my improved arrangements are available is very large, and it is also obvious that while under some conditions certain arbitrary matters must form part of any system having in view the correlation or complementing of light and shade and color with music, they should be capable of a large amount of flexibility or elasticity in the way of adjustment to meet the widely various conditions presented by the range of musical compositions.

There are many compositions or works of classical and other music whose themes suggest the tonal or color aspect of the atmosphere, whether brilliant light or shadow, twilight, or darkness, or anything between the highest intensity of light on the one side, and the deepest shade of night or blackness on the other side; and the essential object of my invention is the provision of means whereby the music, however interpreted or by whatever means, may be accompanied by changes in the degrees of light of the atmospheric and other surroundings properly associated with such music, and with or without the accompaniment of color.

The means employed for attaining this result must be highly sensitive or elastic in order that changes from high light to shade and the various light intensities, or vice versa, and from color to color, which may or may not be associated with the brilliant lighting or the deepest shades of darkness, may grow or ebb in insensible gradations as the loud and soft notes or tones of music can grow or ebb; or may blend with each other gradually; or may follow each other in sharp contrast, depending upon the arbitrary arrangement of the lighting or coloring to which any particular musical composition or theme is especially adapted to respond from the viewpoint of artistic and æsthetic beauty.

As may be readily understood, music of a light and airy character might well be complemented with lighting effects which include the paler shades of any of the primary colors of the spectrum rays; the majestic themes may have the higher intensities of light and the deeper or more intense coloration; and the heavy and sombre musical works the deeper shades and the darker tones. It is obvious further that many different forms and types of mechanism may be employed to accomplish these results.

These and other features of my invention are more fully disclosed hereinafter, reference being had to the accompanying drawings showing several forms of mechanism which may be employed within the scope of my invention, in which:

Figure 1, is a fragmentary diagrammatic view of a lighting system within the scope of my invention in which light producing means, which may be electric lamps, are controlled by a perforated sheet such as is employed in mechanical music players; the sheet so employed having a line of perforations, through the instrumentality of which, acting in connection with properly cooperative means or parts, instantaneous control of the lighting means is effected.

Figure 2:
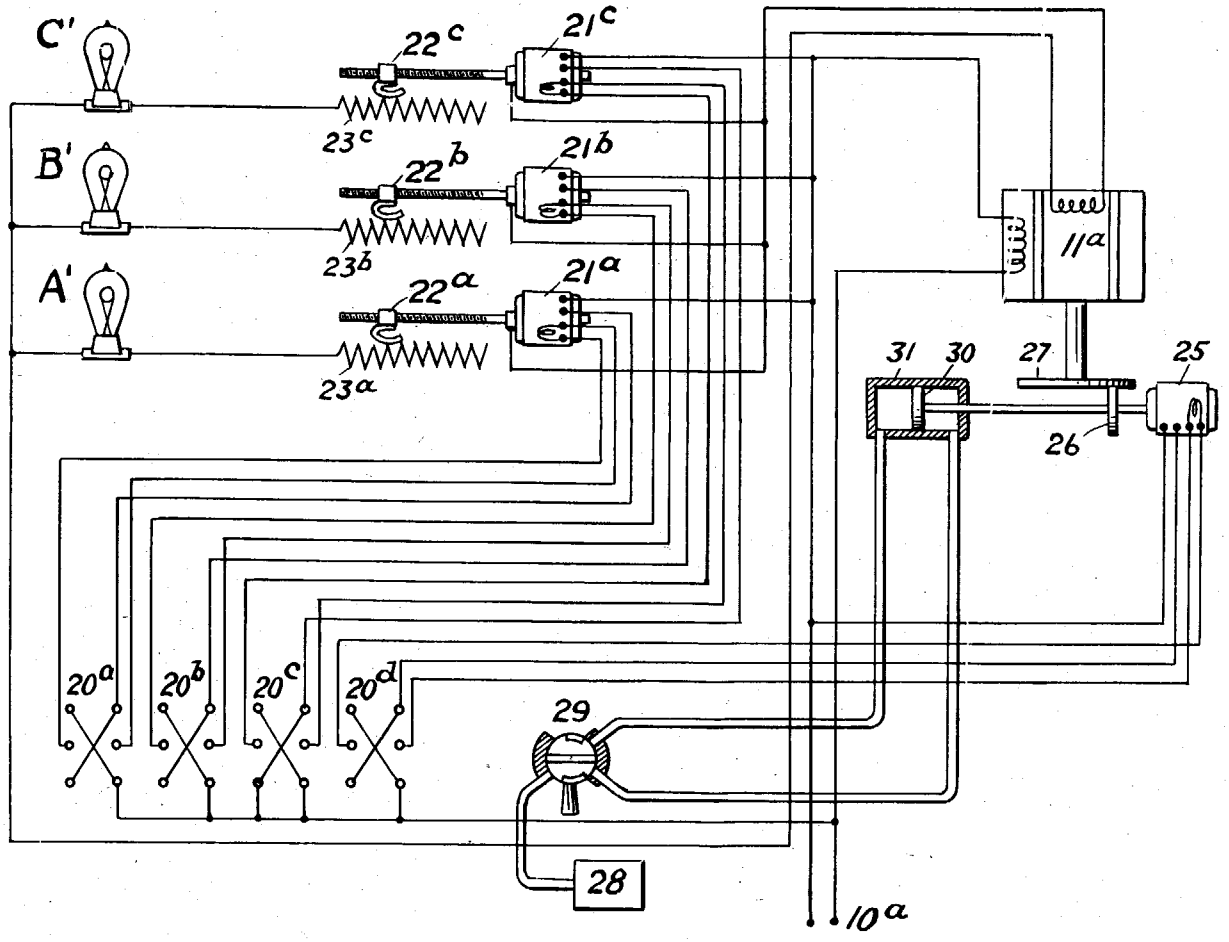
Figure 3:
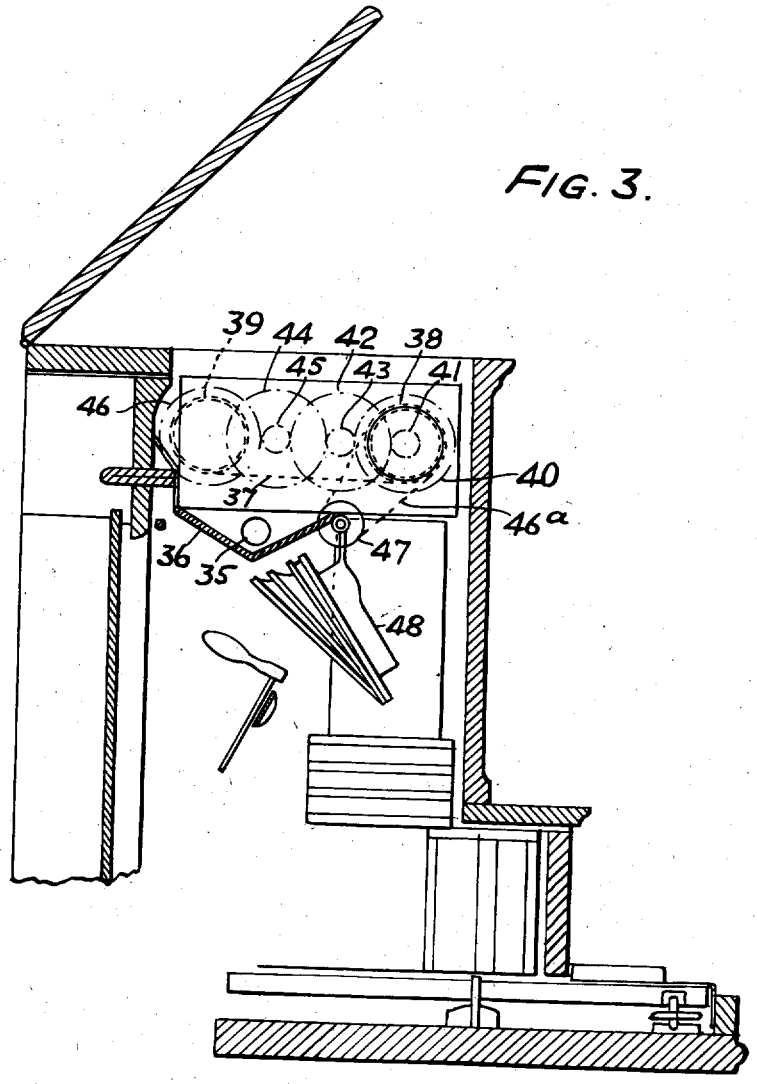

Fig. 2 is a diagrammatic view of other means which I may employ to produce the desired lighting effects, with or without color accompaniment, and Fig. 3 is a diagrammatic view of a portion of a piano, organ or other key-played instrument having means whereby atmospheric coloring in various intensities or shades may be produced.

In Fig. 1, I have shown a method of varying the intensity of a plurality of light sources as represented by lamps A, B and C. The drawing shows automatic controlling means. For this purpose, I prefer to use a standard type of perforated music sheet to automatically throw on and off the light supplying medium or source, and to control the same, individually or collectively, by means of a suitable voltage regulator or any means capable of performing the desired function.

In the system diagrammatically illustrated in Fig. 1; 1 represents a perforated music sheet common to mechanical music players; the same passing over the usual tracker board 2, having the usual apertures 3 controlling the musical notes or tones. In addition such sheet is provided with additional rows of apertures $3^a$, $3^b$, $3^c$ and $3^d$, designed to cooperate with apertures $2^a$, $2^b$, $2^c$ and $2^d$ of the tracker board 2 whereby the control of the lighting or darkening intensity may be effected.

Each light source may be controlled by a rotary switch $4^a$, $4^b$, $4^c$ or $4^d$, and these switches carry notched disks $5^a$, $5^b$, $5^c$ and $5^d$, which are actuated by ratchet pawls $6^a$, $6^b$, $6^c$ and $6^d$, operatively connected to the cores of the magnetic solenoids $7^a$, $7^b$, $7^c$ and $7^d$, when the latter are energized by the closing of the contacts $8^a$, $8^b$, $8^c$ and $8^d$ through the expansion of the bellows $9^a$, $9^b$, $9^c$ and $9^d$.

The general operation is as follows:

A suitable source of current supply, indicated at 10 is provided for supplying current to the lamps A, B and C to the solenoids $7^a$ $7^b$, $7^c$ and $7^d$, and to the voltage regulator or other device 11. When the aperture or hole $3^d$ in the music sheet registers with the aperture $2^d$ of the tracker board, the bellows $9^d$ expands and closes the contacts $8^d$, thus energizing the solenoid $7^d$, and the plunger or core thereof moved upward, turning the ratchet disk $5^d$ by the pawl $6^d$, and operating the rotary switch $4^d$, which closes the main circuit.

When the aperture $3^a$ in the music sheet registers with the aperture $2^a$ of the tracker board, the bellows $9^a$ expands slightly, from the position shown in Fig. 1, in which its upper edge lightly bears against the lower surface of the contacts $8^a$ and on its expansive movement closes the contacts $8^a$, thereby energizing the solenoid $7^a$, and the plunger or core thereof moves upward, turning the ratchet disk $5^a$ by the pawl $6^a$, and operating the rotary switch $4^a$. This supplies current to the lamp A.

When the apertures $3^b$ or $3^c$ of the music sheet register with the complemental apertures $2^b$ or $2^c$ in the tracker board, the operation of the several elements to supply current to the lamps B and C is the same as that effected by the registration of the apertures $2^d$ and $3^d$. When it is desired to throw off the main current, the rotary switch $4^d$ is to be turned, and this may be effected by providing an aperture $3^{dd}$ at the end of the music sheet, designed to register with the aperture $2^d$ of the tracker board and move the bellows $9^d$ to close the contacts $8^d$ and actuate the solenoid $7^d$ to close the switch $4^d$. From the above, it will be seen that any number of apertures $3^a$, $3^b$, $3^c$ or $3^d$ may be made in the music sheet so as to automatically throw on and off any number of light sources or lamps at the exact instance desired, and the electrical mechanism is entirely disconnected when the final aperture $3^{dd}$ operates the main rotary switch $4^d$.

While electric lamps are shown as the source of illumination, it will be understood that other forms of light producing elements may be employed under the control of the actuating mechanism which cooperates with the apertured music sheet 1.

The voltage regulator 11, which is a special means of varying the pressure or voltage supplied to the light sources or lamps A, B and C, is provided and arranged so that it can be controlled by a hand-lever 13 which, in this case, may also serve as an indicator of the light intensity. This may be connected by gears 14 and 15 to obtain the required sensitive movement of the coil 16, which is normally stationary but free to turn. The position of the coil 16 with respect to the magnetic field 17 gives the voltage applied to the light source, and the movement, therefore, provides a means of varying the light intensity.

While specific means are shown to obtain the desired adjustment in the relation between the coil 16 and the magnetic pole or field 17, any other means of turning the coil 16 may be provided. This movement might be effected by a pedal, or by fluid pressure under the control of a suitable valve, which could be operated automatically by the use of apertures in the music sheet 1, thus making the entire control of the light and its intensities automatic through the use of perforations or apertures in the music sheet, which perforations may be produced simultaneously with the perforations which control the musical notes.

While the arrangement indicated is shown as controlling individual lamps A, B and C: the switches being arranged to increase or decrease the intensity of light at will, the lights may be arranged in banks, clusters or other combinations and in various color tones or shades, and with color screens or other means so that any desired color effect may be produced to any desired intensity or degree, and the lighting effects so produced are complemental to the musical tones, although the arrangement may be more or less of an arbitrary one from an æsthetic or artistic standpoint.

Fig. 2 shows an arrangement which may be employed for the control of two or more high candle power lamps or other illuminating elements. Lamps A′, B′ and C′ may be single lamps of any wattage capacity, or they may represent any number of lamps operated in banks as individual units. Any number of units can be used and controlled in the manner shown.

Reversing switches $20^a$, $20^b$ and $20^c$ here shown, may be arranged similar to the tilting tablet of an organ, or otherwise modified in design; the object being to provide two movements, one to close one circuit, and the other to open this circuit and close another circuit. A key arrangement could be employed for this purpose. These reversing switches may be arranged to control, respectively, the motors $21^a$, $21^b$ and $21^c$. When one of these switches is thrown in $20^a$, for instance, the corresponding motor $21^a$ will run in one direction or the other, thus driving the sliding contact $22^a$, and cutting in or out the desired amount of resistance in the resistance element or coil $23^a$. When the switch is thrown in the opposite direction, the motor reverses and the operation of the sliding contact is likewise reversed. This provides means for increasing or decreasing the intensity of the lamps A′, B′ or C′; each lamp being controlled individually.

$10^a$ may represent the source of current supply for the electrical circuit and equipment shown, and $11^a$ may represent a voltage regulator or other device capable of the same or similar function which may be controlled by a reversing switch $20^d$, disposed adjacent the reversing switches $20^a$, $20^b$ and $20^c$. A tilting table key or any other mechanical means, arranged so that it will operate as a switch, may be employed. The position of the switch $20^d$ controls the operation of the voltage regulator $11^a$ in such a manner that the potential supplied to the lamps A′, B′ or C′ can be gradually increased or decreased automatically from any remote point at which the switch $20^d$ may be located.

The voltage regulator may be driven by a motor or other prime mover 25, and may be operatively connected therewith through a disk drive comprising the friction wheels 26 and 27. The switch $20^d$ controls the motor 25, which in turn actuates the voltage regulator mechanism.

A fluid pressure pump 28 may be provided and equipped with a suitable valve 29, which can be located at any desired point for controlling the position of the disk 26, which may be caused to move by supplying fluid under pressure to either side of the piston 30 in the chamber 31.

The valve, pressure cylinder, disk drive and its accompanying actuating means, a motor or other prime mover, form a means of varying "at will" the voltage supplied from the voltage regulator. With this arrangement, the change in speed either slower or faster can be obtained by the simple movement of the valve correlating the manner of growth of the dynamics of sound with the dynamics of light, which valve may be under the control of the musician or under the control of a perforated sheet or other means properly synchronized or correlated with the musical themes interpreted by the artist upon the instrument played.

The device or structure illustrated in Fig. 3, is designed to produce by simple means, such as may be readily attached to an organ or piano or similar musical instrument, a color flooding or shading of the atmosphere by disposing within or adjacent to the musical instrument suitable lighting means, a reflector, and a colored screen in the form of a translucent or relatively transparent ruled sheet through which the light may show; the structure being provided with driving means whereby the colored screen may be moved simultaneously with the progress of the music as played by the performer, or by an automatically actuated mechanical-player, under such conditions that the desired light diffusion or shadow with or without coloration, may be properly associated as to time with the musical notes or tones.

In this arrangement, a source of light such as an electric lamp indicated at 35 may be employed, which lamp may be backed by a reflector 36, and above the light a colored film 37 may be arranged; such film being carried by a roll 38 from which it may be unwound, with a roll 39 upon which it may be wound. The roll 39 may be positively driven from the roll 38, by a suitable train of gearing 40, 41, 42, 43, 44, 45 and 46; the roll 38 being positively driven by a chain or belt $46^a$, from a wheel 47, which may be actuated by a suitable motor 48, by electromagnetic control or by any other suitable means.

For the coloring effect, as may be well understood, colored lamps may be employed, with or without previously determined or set sequence, or colored screens may be employed, or means may be arranged whereby the primary colors of the solar spectrum can be utilized with the aid of a suitable lens (or lenses), a filter (or filters), placed in proper relation with the lighting means and with the desired or necessary instrumentalities for cutting off portions of the spectral colors, or of blending two or more of the same to produce any desired tone of the color in any desired gradation or intensity; insensibly growing or lessening or brought in as willed. Additionally, this lighting may be in the nature of flood lighting in which the performer may be placed, or any limited zone or portion directly surrounding the performer or performers, or disposed at any other parts of the circumambient space and within hearing of the musical tones, as may be desired, and controlled from any point to give the desired unity of impression through unity of design over the space desired simultaneously; reaching the individual in three dimensional manner as sound reaches him.

I claim:

1. The combination with means, for producing musical notes, of lighting means, means for gradually effecting changes in light produced by said lighting means, and means for varying the intensity of said light, both of said means being timed with the musical notes produced.

2. The combination with means for producing musical notes of a source of illumination, means for gradually effecting changes in the light produced by said source, means for varying the intensity of the said light and means for timing both of said means with the musical notes produced.

3. The combination with a musical instrument, of lighting means, means controlled by said instrument for gradually effecting changes in said lighting means, means for varying the intensities of said lighting means, and means for timing the intensities with the musical notes produced.

4. The combination with light producing means and sound producing means, of means for gradually effecting changes in the light, and other means for effecting changes in the light intensities, both of said means operating in timed relation with the sounds produced.

5. The combination with a musical instrument, a perforated sheet, and means whereby said perforated sheet automatically effects the production of music by said instrument, of a lighting circuit, means whereby said perforated sheet controls said circuit, and means for varying the intensity of the light produced by the lighting circuit.

6. The combination with a musical instrument, of colored lamps, means whereby said instrument selectively illuminates said lamps, and manually controlled means for varying the intensities of the light produced by the said lamps in timed relation to the musical tones produced by the said instrument.

7. The method of associating musical sounds with accompanying illumination, which consists in providing a source of light, automatically effecting changes in the color of said light, and varying the intensity of the light produced in timed relation to the musical tones produced.

8. The method of combining sound and light for æsthetic expression which consists in producing sounds in a rhythmic relationship and simultaneously producing lighting effects within the area of audibility of the sounds by varying the intensity of the light in timed relationship with the sounds.

9. The method of combining sound and light for æsthetic expression, consisting in producing audible sounds in timed, rhythmic relationship, flooding with light an area within the area of audibility of the sound and simultaneously producing gradual variations in the light in timed relationship with the emotional or æsthetic content of a succession of such sounds.

10. The method of combining sound and light for æsthetic expression, consisting in producing audible sounds in timed, rhythmic relationship, flooding with light an area within the area of audibility of the sound and simultaneously producing gradual variations in the color and intensity of the light in timed relationship with the emotional or æsthetic content of a succession of such sounds.

11. The method of combining sound and light for æsthetic expression, consisting in producing audible sounds in timed, rhythmic relationship, flooding with light an area within the area of audibility of the sound, and simultaneously producing gradual variations in the light in timed relationship with the musical effect produced by a succession of such sounds.

12. The method of combining sound and light for æsthetic expression consisting in producing audible sounds in timed rhythmic relationship, producing a light in an area within the area of audibility of the sound, maintaining said light during a succession of such sounds, and producing gradual variations in the light without extinguishing it in timed relationship with such succession of sounds.

13. The method of combining light and rhythmic sound for æsthetic expression which consists in merging in sympathy with the successive emotional values of rhythmic sound the intensity or color of lights from a source of light without interrupting the light for a substantial length of time.

14. The method of combining light and sound for æsthetic expression, consisting in producing music and producing a flood lighting within the range of audibility of the said music and varying while maintaining for a substantial length of time the emotional values of the light in sympathy with or complemental to the successive emotional values of the music.

15. The method of combining light and sound for æsthetic expression which consists in producing rhythmic sound having successive emotional values and producing light within a range of audibility of said sound, and in variably merging color of the light in sympathy with the successive emotional values of the sound.

16. The method of combining sound and light for æsthetic expression which consists in producing rhythmic sound and producing a flood lighting within the range of audibility of said sound, and varying while maintaining said light in sympathy or contrast with successive emotional values of said sound.

17. The method of combining sound and light for æsthetic expression, which consists in producing rhythmic sound, producing a flood lighting within the range of audibility of said sound, and varying said light by insensible gradations in sympathy with or contrast to the successive emotional values of said rhythmic sound.

In testimony of which invention, I have hereunto set my hand, at Philadelphia, Pennsylvania, on this 13th day of October, 1924.

MARY HALLOCK GREENEWALT.

DISCLAIMER

Re. 16,825.—*Mary Hallock Greenewalt*, Philadelphia, Pa. METHOD OF AND MEANS FOR ASSOCIATING LIGHT AND MUSIC. Patent dated December 20, 1927. Disclaimer filed December 23, 1933, by the patentee.

Hereby enters the following disclaimer, the aforesaid claims numbers 1 to 4 inclusive, and 7 to 17 inclusive, as follows:

I disclaim the use of stereoptically focussed images such as are known as painted pictures and the like, projected between lenses as distinguished from the use of substantially shapeless flood of light.

[*Official Gazette January 16, 1934.*]

trast with successive emotional values of said sound.

17. The method of combining sound and light for æsthetic expression, which consists in producing rhythmic sound, producing a flood lighting within the range of audibility of said sound, and varying said light by insensible gradations in sympathy with or contrast to the successive emotional values of said rhythmic sound.

In testimony of which invention, I have hereunto set my hand, at Philadelphia, Pennsylvania, on this 13th day of October, 1924.

MARY HALLOCK GREENEWALT.

DISCLAIMER

Re. 16,825.—*Mary Hallock Greenewalt*, Philadelphia, Pa. METHOD OF AND MEANS FOR ASSOCIATING LIGHT AND MUSIC. Patent dated December 20, 1927. Disclaimer filed December 23, 1933, by the patentee.

Hereby enters the following disclaimer, the aforesaid claims numbers 1 to 4 inclusive, and 7 to 17 inclusive, as follows:

I disclaim the use of stereoptically focussed images such as are known as painted pictures and the like, projected between lenses as distinguished from the use of substantially shapeless flood of light.

[*Official Gazette January 16, 1934.*]